United States Patent
Dhanabalan et al.

(10) Patent No.: US 10,382,308 B2
(45) Date of Patent: Aug. 13, 2019

(54) PREDICTIVE TECHNIQUE TO SUPPRESS LARGE-SCALE DATA EXCHANGE

(71) Applicant: Citrix Systems, Inc., Fort Lauderdale, FL (US)

(72) Inventors: Praveen Raja Dhanabalan, Bengaluru (IN); Anup Lal Gupta, Bengaluru (IN); Akshata Bhat, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 6 days.

(21) Appl. No.: 15/867,456

(22) Filed: Jan. 10, 2018

(65) Prior Publication Data

US 2019/0215256 A1    Jul. 11, 2019

(51) Int. Cl.
*G06N 5/04* (2006.01)
*G06N 20/00* (2019.01)
*H04L 12/26* (2006.01)

(52) U.S. Cl.
CPC ........... *H04L 43/0876* (2013.01); *G06N 5/04* (2013.01); *G06N 20/00* (2019.01); *H04L 43/16* (2013.01); *H04L 43/50* (2013.01)

(58) Field of Classification Search
CPC ..... H04L 43/0876; H04L 43/16; H04L 43/50; H04L 65/80; H04L 47/2433; H04L 65/4069; H04L 43/08; H04L 45/124; H04L 45/125; H04L 47/10; H04L 47/11; H04L 47/32; H04L 41/147; H04L 63/1433; G06N 20/00; G06N 20/10; G06N 20/20; G06N 5/04; G06F 17/18; G06F 11/00; G06F 15/173
See application file for complete search history.

(56) References Cited

U.S. PATENT DOCUMENTS

| | | | |
|---|---|---|---|
| 2004/0153563 A1* | 8/2004 | Shay | H04L 41/142 709/232 |
| 2009/0046583 A1* | 2/2009 | Towster | H04L 41/0896 370/232 |
| 2017/0279698 A1* | 9/2017 | Sartran | H04L 43/0876 |

* cited by examiner

*Primary Examiner* — Ian N Moore
*Assistant Examiner* — Brian T Le
(74) *Attorney, Agent, or Firm* — Christopher J. McKenna; Daniel Rose

(57) ABSTRACT

The systems and methods discussed herein provide for a predictive monitoring technique to suppress data exchange between the client device or devices and the monitoring device or devices. Regression-based intelligent predictions systems executed both by the client device or devices and the monitoring device or devices perform identical prediction algorithms. If the predicted metric values and the actual measured metric values on the client device are very close, then the client device may skip transmitting the measured metric values to the monitoring device; similarly, if a measured metric value is not received by the monitoring device, then the monitoring device knows that the measured metric was similar to the predicted metric on the client device, and accordingly may utilize the predicted metric on the monitoring device. Because transmission of the measured metric values may be skipped, network traffic and interface and processor utilization is significantly decreased.

20 Claims, 6 Drawing Sheets

PREDICTIVE TECHNIQUE TO SUPPRESS LARGE-SCALE DATA EXCHANGE

FIELD OF THE DISCLOSURE

The present application generally relates to data transmission over a network, and remote monitoring.

BACKGROUND OF THE DISCLOSURE

Many systems utilize remote monitoring of various metrics, from network conditions (e.g. congestion, bandwidth, latency, etc.) to device conditions (e.g. temperature, utilization, storage levels, etc.) to any other type and form of metrics (e.g. accelerometer values, environmental humidity, voltage presence, etc.). These metrics may be gathered by a local or client device, and transmitted via a network to a remote or monitoring device.

Depending on the number of metrics and frequency of monitoring, the amount of data being exchanged between the client device and monitoring device may be very large, consuming significant bandwidth and network resources. Worse, as the system scales, the amount of data may become very large. For example, a centralized monitoring device may be in communication with thousands or tens of thousands of networked Internet-of-Things devices, each of which may be sending a dozen different monitoring values every few seconds, resulting in massive amounts of data being received and processed by the monitoring device, a large number of network sockets and buffers being utilized, and even significant amounts of electrical power. All of this resource consumption limits the scalability of the monitoring system.

BRIEF SUMMARY OF THE DISCLOSURE

The systems and methods discussed herein provide for a predictive monitoring technique to suppress data exchange between the client device or devices and the monitoring device or devices. Regression-based intelligent predictions systems executed both by the client device or devices and the monitoring device or devices perform identical prediction algorithms. If the predicted metric values and the actual measured metric values on the client device are very close, then the client device may skip transmitting the measured metric values to the monitoring device; similarly, if a measured metric value is not received by the monitoring device, then the monitoring device knows that the measured metric was similar to the predicted metric on the client device, and accordingly may utilize the predicted metric on the monitoring device. Because transmission of the measured metric values may be skipped, network traffic and interface and processor utilization is significantly decreased.

Furthermore, based on a combination of defined priority thresholds and frequency of access of the monitored data, acceptable levels of error between the predicted and actual data may be applied to further reduce the amount of data transmitted. For example, if the data is very critical, the system may skip transmitting measured metrics only if predicted data exactly matches the actual data. However, if the data is not critical, then the system may skip transmitting measured metrics that are close but not identical to the actual data.

In a first aspect, the present disclosure is directed to a method for prediction-based data exchange. The method includes identifying, by a monitor of a device, a first measured value for a metric. The method also includes transmitting, by the device, the first measured value for the metric to a remote management device. The method also includes generating, by a local prediction service of the device, a first locally predicted value for the metric. The method also includes identifying, by the monitor, a second measured value for the metric. The method also includes determining, by the device, that a difference between the first locally predicted value and the second measured value does not exceed a first threshold. The method also includes, responsive to the determination, skipping transmission of the second measured value, by the device to the remote management device, the remote management device executing a remote prediction service generating a first remotely predicted value for the metric of the device corresponding to the first locally predicted value.

In some implementations, transmitting the first measured value for the metric to the remote management device further includes generating, by the local prediction service, a second locally predicted value for the metric; determining, by the device, that a difference between the second locally predicted value and the first measured value exceeds the first threshold; and, responsive to the determination that the difference between the second locally predicted value and the first measured value exceeds the first threshold, transmitting the first measured value to the remote management device.

In some implementations, the method includes incrementing a counter of the device, responsive to skipping transmission of the second measured value. In a further implementation, the method includes determining, by the device, that a difference between a subsequent locally predicted value generated by the local prediction service for the metric and a corresponding measured value identified by the monitor for the metric does not exceed the first threshold; identifying that a value of the counter exceeds a second threshold, responsive to the determination that the difference between the subsequent locally predicted value and the corresponding measured value does not exceed the predetermined threshold; and transmitting the corresponding measured value identified by the monitor to the remote management device, responsive to the identification that the value of the counter exceeds the second threshold. In another further implementation, the method includes resetting the counter, responsive to transmitting the corresponding measured value received by the monitor to the remote management device. In still another further implementation, the method includes setting the second threshold to a value inversely proportional to a frequency of utilization of the metric.

In some implementations, the method includes generating the first locally predicted value for the metric by generating the first locally predicted value, by the local prediction service, using a subset of measured values for the metric identified by the monitor and transmitted to the remote management device. In a further implementation, the method includes updating coefficients of a prediction model, by the local prediction service, using the subset of measured values. In a still further implementation, the method includes transmitting the updated coefficients of the prediction model to the remote management device. In some implementations, the method includes generating, by the local prediction service, a second locally predicted value for the metric; identifying, by the monitor, a third measured value for the metric; identifying, by the monitor, that the third measured value is below a second threshold; determining, by the device, that a difference between the second locally predicted value and the third measured value is non-zero, responsive to the identification that the third measured value is below the second threshold; and, responsive to the determination that the difference between the second locally predicted value and the third measured value is non-zero and the identification that the third measured value is below the second threshold, transmitting the third measured value to the remote management device.

In another aspect, the present disclosure is directed to a method for prediction-based data exchange. The method includes generating, by a prediction service of a device, a first locally predicted value for a metric of a remote device. The method also includes determining, by the device, that a first measured value for the metric has not been received from the remote device within a predetermined period of time, the remote device skipping transmission of the first measured value to the device responsive to a difference between the first measured value and a first remotely predicted value for the metric generated by a remote prediction service of the remote device not exceeding a first threshold; and, responsive to the determination, adding the first locally predicted value for the metric to a log for the remote device.

In some implementations, the method includes generating, by the prediction service of the device, a second locally predicted value for the metric of the remote device; receiving, by the device from the remote device, a second measured value for the metric; adding the received second measured value for the metric to the log for the remote device; and discarding the second locally predicted value for the metric of the remote device, responsive to receipt of the second measured value. In some implementations, the method includes updating a model of the prediction service of the device with the received second measured value for the metric of the remote device.

In another aspect, the present disclosure is directed to a system for prediction-based data exchange. The system includes a monitor, configured to identify a first measured value for a metric; and a management client, configured to transmit the first measured value for the metric to a remote management device. The system also includes a local prediction service, configured to generate a first locally predicted value for the metric. The management client is configured to determine that a difference between the first locally predicted value and a second measured value identified by the monitor does not exceed a first threshold and responsive to the determination skip transmission of the second measured value to a remote management device, the remote management device executing a remote prediction service generating a first remotely predicted value for the metric of the device corresponding to the first locally predicted value.

In some implementations, the local prediction service is further configured to generate a second remotely predicted value for the metric; and the management client is further configured to determine that a difference between the second remotely predicted value and the first measured value exceeds the first threshold and responsive to the determination, transmit the first measured value for the metric to the remote management device.

In some implementations, the system includes a counter, and the management client is configured to increment a value of the counter, responsive to skipping transmission of the second measured value. In a further implementation, the management client is further configured to determine that a difference between a subsequent locally predicted value generated by the local prediction service for the metric and a corresponding measured value identified by the monitor for the metric does not exceed the first threshold; and the management client is further configured to: identify that a value of the counter exceeds a second threshold, responsive to the determination that the difference between the subsequent locally predicted value and the corresponding measured value does not exceed the predetermined threshold; and transmit the corresponding measured value identified by the monitor to the remote management device, responsive to the identification that the value of the counter exceeds the second threshold. In a still further implementation, the management client is further configured to set the second threshold to a value inversely proportional to a frequency of utilization of the metric.

In some implementations, the local prediction service is further configured to generate the first locally predicted value using a subset of measured values for the metric identified by the monitor and transmitted to the remote management device. In some implementations, the local prediction service is further configured to generate a second locally predicted value for the metric; and the monitor is further configured to identify a third measured value for the metric, and identify that the third measured value is below a second threshold. The management client is further configured to determine that a difference between the second locally predicted value and the third measured value is non-zero, responsive to the identification that the third measured value is below the second threshold; and the management client is further configured to transmit the third measured value to the remote management device, responsive to the determination that the difference between the second locally predicted value and the third measured value is non-zero and the identification that the third measured value is below the second threshold.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
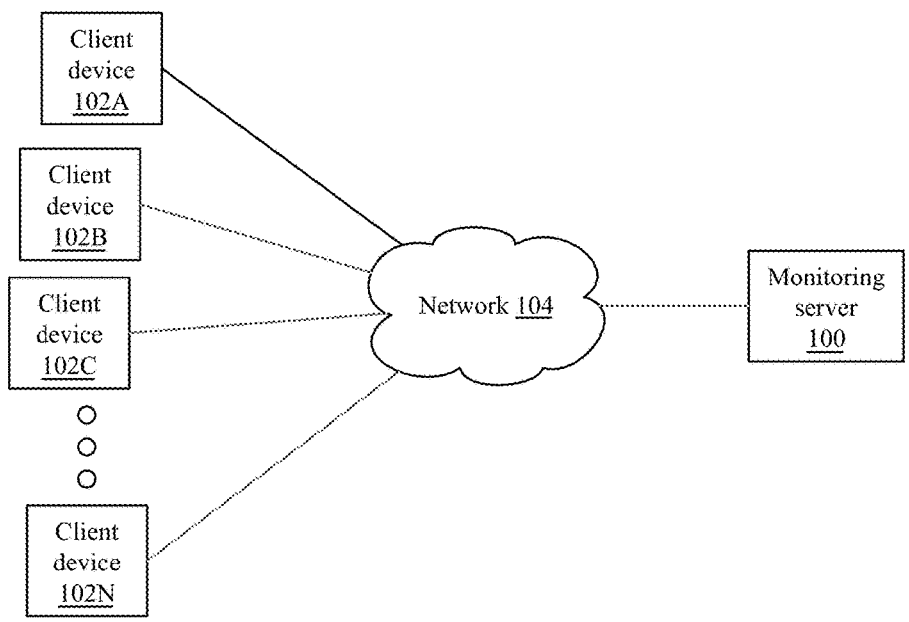
FIG. 1A is a block diagram illustrating a network environment for use with implementations of the systems and methods discussed herein.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Many systems utilize remote monitoring of various metrics, from network conditions (e.g. congestion, bandwidth, latency, etc.) to device conditions (e.g. temperature, utilization, storage levels, etc.) to any other type and form of metrics (e.g. accelerometer values, environmental humidity, voltage presence, etc.). These metrics may be gathered by a local or client device, and transmitted via a network to a remote or monitoring device.

For example, FIG. 1A is a block diagram illustrating a network environment for use with implementations of the systems and methods discussed herein. A logging server or monitoring server 100, sometimes referred to as a monitoring service, remote monitoring device, logging device, centralized control device, management device, measurement server, or by any other similar terms, may communicate via a network 104 with one or more client devices 102A-102N, referred to generally as client device(s) 102.

Client devices 102 may comprise any type and form of computing device, including laptop computers, desktop computers, portable computers, wearable computers, tablet computers, embedded systems, virtual machines, physical machines, IoT devices or "smart" appliances, monitoring devices, measurement devices, or any other such type and form of devices. Client devices 102 may measure or receive measurements of various metrics, including network conditions (e.g. bandwidth, congestion, error rates, latency, jitter, ping times, noise, buffer levels, data transfer rates, number of connections, etc.), environmental conditions (e.g. temperature, humidity, vibration, sound levels, light levels, magnetic readings, etc.), device conditions (e.g. processor utilization, memory utilization, storage levels, internal temperatures, etc.), or any other type and form of metric. Metrics may be measured or received at any frequency, including once per millisecond, once per second, once per minute, once per hour, etc. Metrics may be measured by the client device directly, or may be received from another device performing the measurement and transmitting the result to the client device. In many implementations, the client device may measure or receive multiple metrics.

Client devices 102 may transmit measured metrics via network 104 to a monitoring server 100. Network 104 may comprise one or more networks of the same or different types, including standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, satellite connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). Although shown as a single network 104, in many implementations, network 104 may comprise a plurality of networks and intermediary devices (e.g. switches, routers, firewalls, gateways, modems, or other devices).

Monitoring server 100 may comprise any type and form of computing device, including a server device, workstation device, rackmount device, appliance, cluster, server farm, virtual machine executed by a physical machine, or any other such device. Monitoring server 100 may receive measured metrics from one or more client devices 102 and, in some implementations, may store the measured metrics to a log or similar data file. The log or data file may be displayed or otherwise provided to a user or administrator, or may be transmitted to another device for monitoring and/or analysis.

Depending on the number of metrics and frequency of monitoring, the amount of data being exchanged between the client device and monitoring device may be very large, consuming significant bandwidth and network resources. For example, given a topology with IoT devices transmitting 100 KB of data per unit time (e.g. a few seconds or a minute), and 1000 such devices connected to a monitoring server, the monitoring server may need to receive and process 100 GB of data per unit time. Worse, as the system scales, the amount of data may become very large. For example, a centralized monitoring device may be in communication with thousands or tens of thousands of networked IoT devices, each of which may be sending a dozen different monitoring values every few seconds, resulting in massive amounts of data being received and processed by the monitoring device, a large number of network sockets and buffers being utilized, and even significant amounts of electrical power. All of this resource consumption limits the scalability of the monitoring system.

Instead, the systems and methods discussed herein provide for a predictive monitoring technique to suppress data exchange between the client device or devices and the monitoring device or devices. Regression-based intelligent predictions systems executed both by the client device or devices and the monitoring device or devices perform identical prediction algorithms. If the predicted metric values and the actual measured metric values on the client device are very close, then the client device may skip transmitting the measured metric values to the monitoring device; similarly, if a measured metric value is not received by the monitoring device, then the monitoring device knows that the measured metric was similar to the predicted metric on the client device, and accordingly may utilize the predicted metric on the monitoring device. Because transmission of the measured metric values may be skipped, network traffic and interface and processor utilization is significantly decreased.

Furthermore, based on a combination of defined priority thresholds and frequency of access of the monitored data, acceptable levels of error between the predicted and actual data may be applied to further reduce the amount of data transmitted. For example, if the data is very critical, the system may skip transmitting measured metrics only if predicted data exactly matches the actual data. However, if the data is not critical, then the system may skip transmitting measured metrics that are close but not identical to the actual data.

Figure 1B:
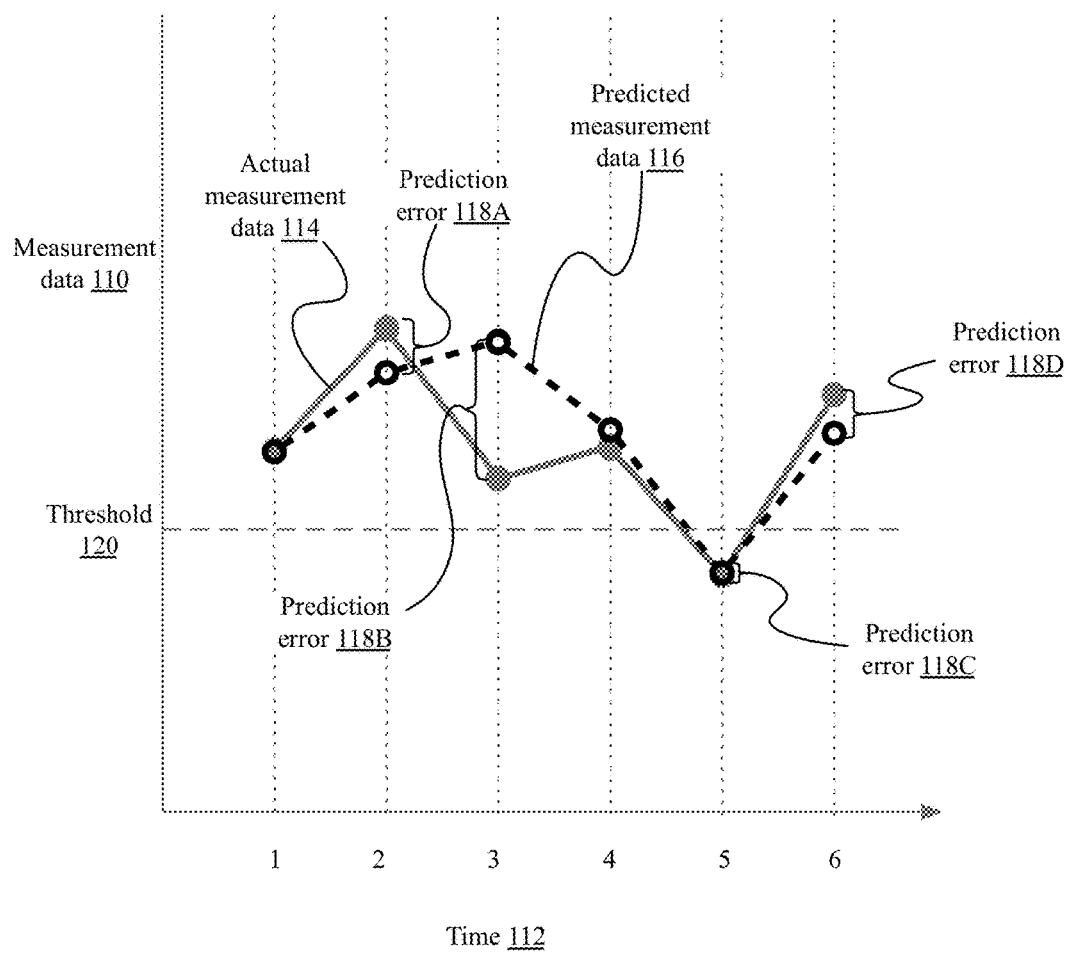
FIG. 1B is a graph illustrating an example of measured metrics and predicted metrics, according to one implementation.

FIG. 1B is a graph of measurement data 110 over time 112, illustrating an example of measured metrics 114 and predicted metrics 116, according to one implementation. As shown, metrics 114, 116 may be measured or predicted periodically, at times t=1, 2, 3, etc. Time 112 may be measured in any units, including milliseconds, hundredths of a second, seconds, minutes, hours, or any other such unit. For example, in many implementations, measurements may be made or predicted every 10 seconds. Similarly, measurement data 110 may be of any type and form corresponding to a metric, and may include positive and/or negative values (for example, temperature in degrees Celsius; positive and negative accelerations of an accelerometer in m/s^2 or G's; bandwidth of a communication link in MB/s; etc.).

As discussed above, a client device may periodically make or receive actual measurements 114, shown as solid grey dots connected by interpolated straight lines. A multi-variable time series regression model, tuned to achieve good accuracy by feature selection and cross validation tuning, may also be run on the client device by a prediction service, to generate corresponding predicted measurements 116, shown as open dots connected by interpolated dashed lines. Although shown as straight lines, the interpolations may be non-linear (e.g. Bezier curves, geometric approximations, etc.). The prediction model used by the prediction service may be tuned or trained using actual measurement data 114, or a subset of actual measurement data in many implementations, as discussed below.

In many implementations, the prediction service may not be perfectly accurate, and accordingly, a prediction error 118A-118D may exist for each pair of actual measurements and predicted measurements. Prediction error 118 may be determined as a difference between the actual measurement data and predicted measurement data for any time unit. In some implementations, the prediction error 118 may comprise an absolute value of the difference (e.g. |[actual measurement value]−[predicted measurement value]| or max ([actual measurement value],[predicted measurement value])−min([actual measurement value],[predicted measurement value]). In some implementations, the prediction error 118 may comprise a percentage difference compared to the actual measurement value (e.g. 100*([actual measurement value]−[predicted measurement value])/[actual measurement value]). In other implementations, the prediction error 118 may comprise a percentage difference compared to a predetermined value or range (e.g. 100*([actual measurement value]−[predicted measurement value])/[predetermine scaling value]). In other implementations, the prediction error 118 may be calculated in any other similar fashion.

To reduce data transmissions between the client device and the monitoring server, in many implementations, actual measurement data 114 may only be sent intermittently, with transmissions of one or more actual measurement data readings skipped. The monitoring server may be executing another prediction service (referred to as the "remote prediction service" or "server prediction service") with identical parameters to the model used by the prediction service on the client device (referred to as the "local prediction service" or "client prediction service"). Accordingly, the remote prediction service may generate the same predicted measurement data 116 as the local prediction service. When actual measurement data 114 is not transmitted from the client device to the server, the server may instead retrieve the predicted measurement data from the server prediction service and use this data for logging or monitoring purposes instead.

In some implementations, actual measurement data may be transmitted when the prediction error 118 is greater than a predetermined error threshold (either by percentage or an absolute value). For example, in the example data shown in FIG. 1B, the error 118A is relatively small, and transmission of the actual measurement data may be skipped. Though the monitoring server will have inaccurate data from its own prediction service, the error may be unimportant. However, at time 3, the error 118B is much larger; accordingly, actual measurement data 114 may be transmitted at this time. The monitoring server, upon receipt of the actual measurement data for time t=3, may write this received data to its log for the client device instead of the predicted measurement data, ensuring that the log remains mostly accurate.

Additionally, in some implementations, the prediction model used by both the client device and the monitoring server may be trained with any actual measurement data 114 transmitted by the client device to the monitoring server. For instance, in the above example, the model may be re-trained using the actual measurement data at time t=3 (the actual measurement data at time t=2 not having been transmitted).

This may "resynchronize" the prediction model on the server with the actual measurement data, reducing subsequent error (e.g. at t=4). The prediction services may not re-train with actual measurement data that was not transmitted from the client device to the server device, to prevent the local prediction service from becoming out of synchronization with the remote prediction service. This ensures that both algorithms are able to make the same prediction.

In many implementations, actual measurement data 114 may also be transmitted periodically, regardless of prediction error values 118, to ensure that the model remains synchronized. For example, the client device may maintain a counter incremented for each skipped transmission and transmit actual measurement data 114 upon the counter reaching a predetermined value (e.g. requiring transmission of actual measurement data 114 after ten skipped transmissions, or any other such value). This may also be used as a "keep-alive" notification from the client device to the server device to notify that the client device is still running properly. The counter threshold may be referred to as a minimum sync time.

In many implementations, one or more thresholds 120 may also be set (e.g. a lower threshold as shown and/or an upper threshold (not illustrated), or threshold ranges). In some such implementations, transmissions of actual data may be made if the measured (and/or predicted) value is beyond the threshold, regardless of the prediction error. In a further implementation, the actual data may be transmitted if the measured and/or predicted value is beyond the threshold, if the prediction error is non-zero. This may be useful for critical ranges of measurement data (e.g. data is not set to centralized service only if the error is 0%).

For example, let us assume that the accepted error rate is 5%. Let the polling time be one time unit. Let the range of values be 0 to 100%. Let us say the critical point or threshold here is below 89. Let us say following are actual and predicted values. The minimum sync period is 10 time units:

TABLE 1

| Local prediction: | Actual measurement | Prediction error | Remote prediction | Comments |
| --- | --- | --- | --- | --- |
| 94 | 98 | 4% | 94 | No data sent |
| 95 | 94 | 1% | 95 | No data sent |
| 96 | 100 | 4% | 96 | No data sent |
| 94 | 90 | 4% | 94 | No data sent |
| 93 | 92 | 1% | 93 | No data sent |
| 90 | 91 | 1% | 90 | No data sent |
| 91 | 93 | 2% | 91 | No data sent |
| 100 | 99 | 1% | 100 | No data sent |
| 100 | 99 | 1% | 100 | No data sent |
| 100 | 98 | 2% | 100 | Last 10 data have error <5%. However, minimum sync period is 10, so to sync the data and prediction algorithm, the actual measurement data is transmitted to the monitoring server |
| 100 | 94 | 6% | 100 | More than 5% error so actual data is sent |
| 89 | 88 | 1% | 89 | Below critical threshold, and error rate is non-zero. Hence, actual data is sent to monitoring server |

Further to this, not all reports or measurements are accessed at same frequency. If the system can determine the access patterns of these reports, via monitoring read operations on this data at the server, the system can tune the minimum sync period to a large number. For example, for measurement data that is frequently accessed, the system may use a minimum sync period of 10; while for data that is less frequently accessed, the system may use a minimum sync period of 20.

In some implementations, the prediction model may be periodically retrained by the local prediction server, e.g. based on actual measurement data. In some implementations, the retraining may be based only on the subset of actual measurement data transmitted to the server. In other implementations, the retraining may be based on all of the actual measurement data. In such implementations, model parameters may be transmitted to the monitoring server after retraining to ensure that the local and remote prediction services are equivalent. The models may be activated simultaneously, e.g. on a predetermined time period or after a subsequent transmission of actual measurement data (e.g. transmit the model parameters; wait one time period; transmit actual measurement data; and begin using the prediction service). This ensures the same model is running on data generators as well as the data collection service.

Figure 2A:
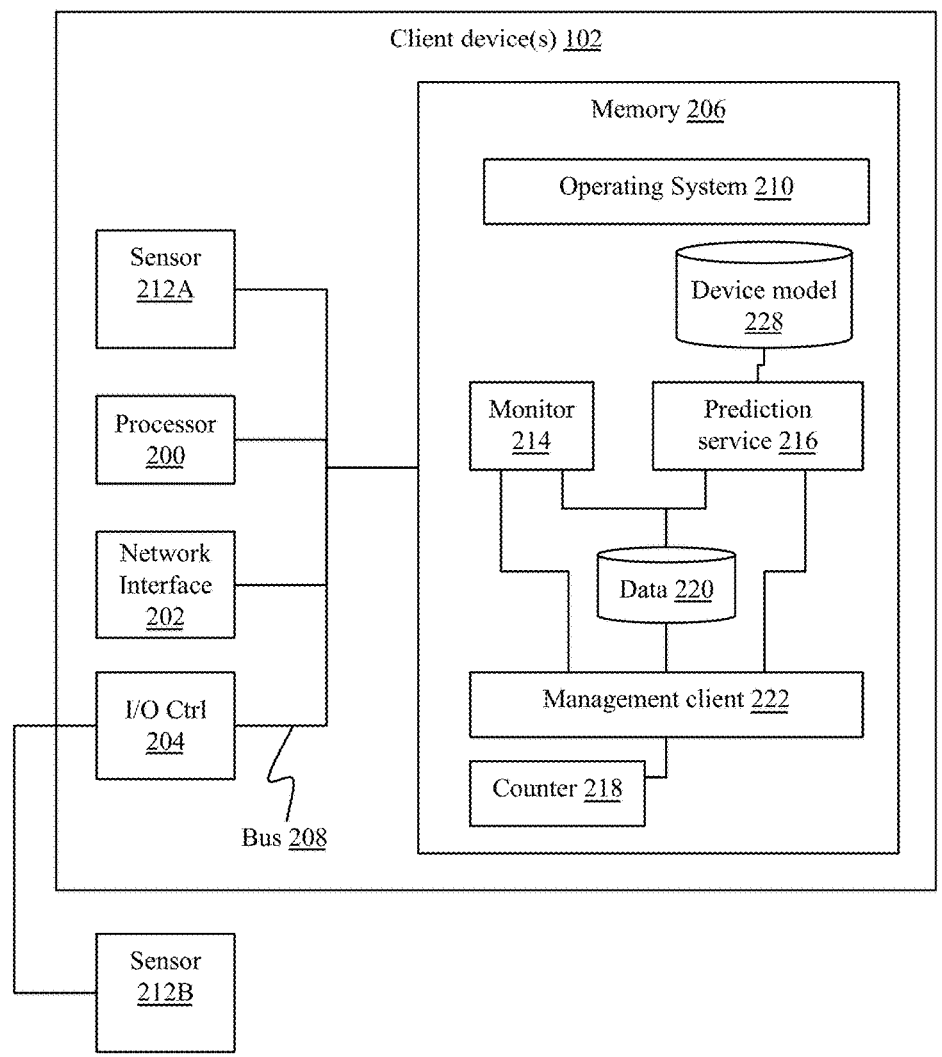
FIG. 2A is a block diagram of an embodiment of a client device for prediction-based data exchange.

FIG. 2A is a block diagram of an embodiment of a client device 102 for prediction-based data exchange, as well as other computing devices including client computing devices, server computing devices, workstation devices, cloud computing devices, or any other type and form of computing device, referred to generally herein as a "computing device" or "computing devices". Such devices may include laptop computers, desktop computers, rackmount computers, tablet computers, wearable computers, appliances, cluster devices or appliances, server clouds or farms, virtual machines executed by one or more physical machines, or any other type of computing device. As shown in FIG. 2A, a computing device may include one or more central processing units or processors 200, one or more network interfaces 202, one or more input/output controllers or devices 204, one or more memory units 206 which may include system memory such as RAM as well as internal or external storage devices. A computing device may also include other units not illustrated including installation devices, display devices, keyboards, pointing devices such as a mouse, touch screen devices, or other such devices. Memory 206 may include, without limitation, an operating system 210 and/or software.

The central processing unit 200 is any logic circuitry that responds to and processes instructions fetched from the memory 206. In many embodiments, the central processing unit 200 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device may be based on any of these processors, or any other processor capable of operating as described herein.

Memory 206, sometimes referred to as a main memory unit, may be one or more memory chips capable of storing data and allowing any storage location to be directly accessed by the microprocessor 200, such as any type or variant of Static random access memory (SRAM), Dynamic random access memory (DRAM), Ferroelectric RAM (FRAM), NAND Flash, NOR Flash and Solid State Drives (SSD). The memory 206 may be based on any of the above described memory chips, or any other available memory chips capable of operating as described herein. In the embodiment shown, the processor 200 communicates with main memory 206 via a system bus 208 (described in more detail below). In other embodiments, the processor communicates directly with main memory 206 via a memory port. For example, in such embodiments, the memory 206 may be DRDRAM. In other embodiments, processor 200 may communicate directly with cache memory via a secondary bus, sometimes referred to as a backside bus. In other embodiments, the main processor 200 communicates with cache memory using the system bus 208. Cache memory typically has a faster response time than memory accessible via a system bus, and is provided by, for example, SRAM, BSRAM, or EDRAIVI.

In some embodiments, the processor 200 communicates with various I/O devices 204 via local system bus 208. Various buses may be used to connect the central processing unit 200 to any I/O devices, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 200 may use an Advanced Graphics Port (AGP) to communicate with the display. In some embodiments, the processor 200 may communicate directly with I/O devices, for example via HYPERTRANSPORT, RAPIDIO, or INFINIBAND communications technology. A wide variety of I/O devices may be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 204 as shown in FIG. 2A. The I/O controller may control one or more I/O devices such as a keyboard and a pointing device, e.g., a mouse or optical pen. Furthermore, an I/O device may also provide storage and/or an installation medium for the computing device. In still other embodiments, the computing device may provide USB connections (not shown) to receive handheld USB storage devices such as the USB Flash Drive line of devices manufactured by Twintech Industry, Inc. of Los Alamitos, Calif.

The computing device may support any suitable installation device (not illustrated), such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device may further include a storage device, such as one or more hard disk drives or redundant arrays of independent disks, for storing an operating system and other related software, and for storing application software programs such as any program or software for implementing (e.g., configured and/or designed for) the systems and methods described herein. Optionally, any of the installation devices could also be used as the storage device. Additionally, the operating system and the software can be run from a bootable medium.

Furthermore, the computing device may include a network interface 202 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device communicates with other computing devices via any type and/or form of gateway or tunneling protocol such as Secure Socket Layer (SSL) or Transport Layer Security (TLS). The network interface xx18 may include a built-in network adapter, network interface card, PCMCIA network card, card bus network adapter, wireless network adapter, USB network adapter, modem or any other device suitable for interfacing the computing device to any type of network capable of communication and performing the operations described herein.

In some embodiments, the computing device may include or be connected to one or more display devices. As such, any I/O devices and/or the I/O controller 204 may include any type and/or form of suitable hardware, software, or combination of hardware and software to support, enable or provide for the connection and use of the display device(s) by the computing device. For example, the computing device may include any type and/or form of video adapter, video card, driver, and/or library to interface, communicate, connect or otherwise use the display device(s). In one embodiment, a video adapter may include multiple connectors to interface to the display device(s). In other embodiments, the computing device may include multiple video adapters, with each video adapter connected to the display device(s). In some embodiments, any portion of the operating system 210 of the computing device may be configured for using multiple displays. One ordinarily skilled in the art will recognize and appreciate the various ways and embodiments that a computing device may be configured to have one or more display devices.

In further embodiments, an I/O device may be a bridge between the system bus 208 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A client device or server of the sort depicted in FIG. 2A may operate under the control of an operating system 210, which control scheduling of tasks and access to system resources. The client device or server can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8, or 10, produced by Microsoft Corporation of Redmond, Wash.; MAC OS and iOS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

As discussed above, the computer system can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system has sufficient processor power and memory capacity to perform the operations described herein.

In some embodiments, the computing device may have different processors, operating systems, and input devices consistent with the device. For example, in one embodiment, the computing device is a smart phone, mobile device, tablet or personal digital assistant. In still other embodiments, the computing device is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

The client device 102 may include and/or communicate with one or more sensors 212A-212B as shown, referred to generally as sensor(s) 212. In some implementations, a sensor 212 may be a hardware sensor, such as a temperature sensor or thermistor, an accelerometer, a switch, or any other such sensor. In some implementations, a sensor 212 may be a software sensor, such as a congestion monitor of a network connection, or a CPU utilization sensor. Sensors 212 may thus be part of the operating system 210, network stack or network interface 202, processor 200, or any other part of the device 102. In many implementations, a sensor 212 may be external to device 102, and may provide data via an I/O controller 204, such as an external sensor connected via USB. In other implementations, a sensor 212 may be connected to a second computing device (not illustrated); the second computing device may transmit data to the client device 102, e.g. via network interface 202.

As discussed above, sensor data may be referred to as actual measurement data and may be periodically measured by a monitor 214. Monitor 214 may comprise hardware, software, or any combination of hardware and software for monitoring or measuring an output of one or more sensors 212. In many implementations, monitor 214 may write sensor measurements to a database or log 220, which may be stored in memory 206 in any suitable data format (e.g. database, flat file, spreadsheet, etc.).

As discussed above, a client device 102 may execute a prediction service 216, sometimes referred to as a local prediction service 216. Prediction service 216 may make predictions of measurement values for one or more sensors 212, based on prediction parameters and coefficients stored in a device model 228. The parameters and coefficients may be generated via training data received by monitor 214 and written to data store 220. The prediction service 216 may calculate a multivariable time-series regression model or forecasting model to generate prediction values. The model may be of any type, including autoregressive models, autoregressive distributed lag models, serial correlation models, autocorrelation models, etc. For example, the prediction model may calculate a prediction value as equal to a first coefficient $ß_0$ plus a second coefficient $ß_1$ times a previous prediction value, plus a third coefficient $ß_2$ times a second previous prediction value, etc. (e.g., $P_t=ß_0+ß_1P_{t-1}+ß_2P_{t-2}+\ldots+ß_x P_{t-x}+u_t$). Predictions may be stored in data 220, in many implementations.

The computing device may execute a management client 222. Management client 222, sometimes referred to as a monitor client, logging client, or by other similar terms, may comprise an application, server, service, daemon, routine, or other executable logic executed by the processor of the device. The management client 222 may be configured to periodically transmit actual measurement data to a monitoring server 100, as discussed above, either at a predetermined destination, or at a dynamically identified destination based on data from a second server or an identifier in a configuration file. The management client 222 may communicate with the server using a network interface 202, and may communicate via any type and form of network or combination of networks. A corresponding server, service, daemon, routine, or other executable logic on the server, which may be referred to as a management host 224, may receive the measurements and add them to a log or database for the client device 102. The measurement data may be transmitted in any type and form of protocol. For example, in some implementations, the measurement data may be transmitted via a representational state transfer (RESTful) request, such as an HTTP GET or POST query with one or more parameters identifying a corresponding one or more metrics and values. In many implementations, management client 222 may transmit a device identifier of client device 102, such as a MAC address, serial number, unique ID (UID), account name, or other such identifier. In some implementations, management client 222 may transmit coefficients of a device model 228 to the server for updating a remote prediction service model.

Management client 222 may maintain a counter 218 in many implementations. Counter 218 may comprise a hardware or software counter, and be configured to count up to a predetermined threshold (e.g. minimum sync period); or be configured to start at a minimum sync period and count down to zero. Management client 222 may increment the counter each time transmission of actual measurement data is skipped.

Figure 2B:
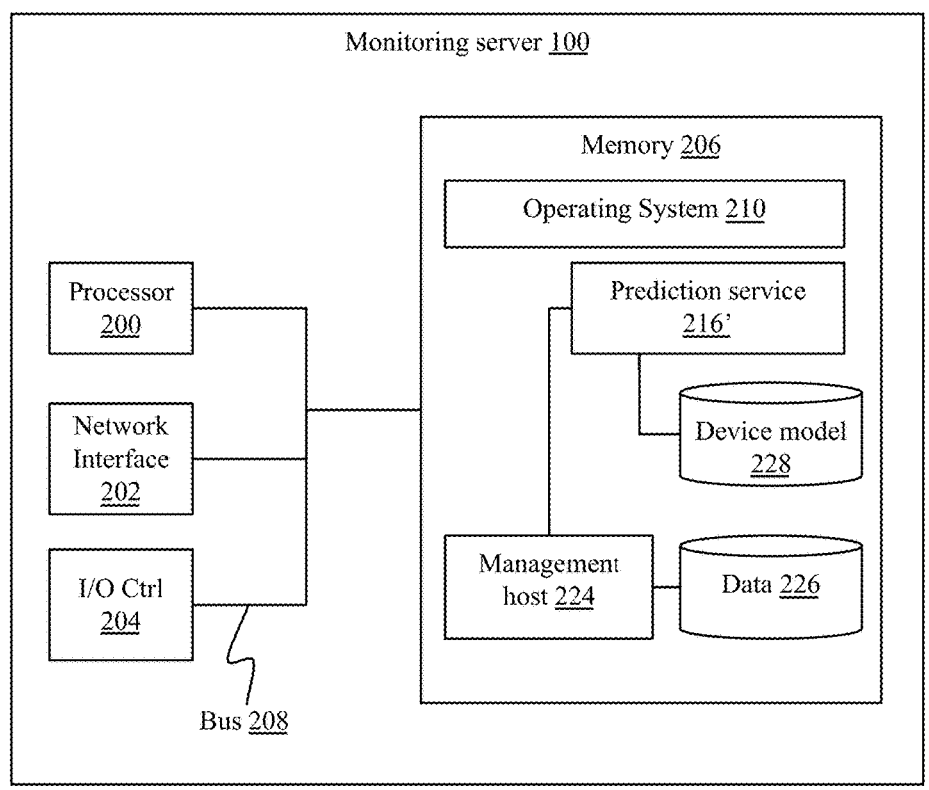
FIG. 2B is a block diagram of an embodiment of a monitoring device for prediction-based data exchange.

FIG. 2B is a block diagram of an embodiment of a monitoring server 100 for prediction-based data exchange. Server 100 may include many of the components discussed above, including one or more processors 200, network interfaces 202, I/O controllers 204, memory devices 206, and an operating system 210. Server 100 may also execute a prediction service 216', referred to as a remote prediction service or monitoring server prediction service or by other similar terms. The remote prediction service 216' may utilize a device model 228 received from one or more client devices 102 to generate predictions for sensor data of each said one or more client devices. The predictions may be written to a database or log 226 for the device, which may be in any appropriate format (e.g. database, flat file, indexed file, spreadsheet, etc.).

Server 100 may also execute a management host 224, which may comprise an application, service, server, daemon, routine, or similar executable logic to receive actual measurement data from client devices and predicted data from remote prediction service 216' and write the data to log(s) 226. In some implementations, management host 224 may be configured to execute alarms, transmit requests or notifications, or perform other operations, responsive to a metric exceeding a predetermined threshold.

Figure 3A:
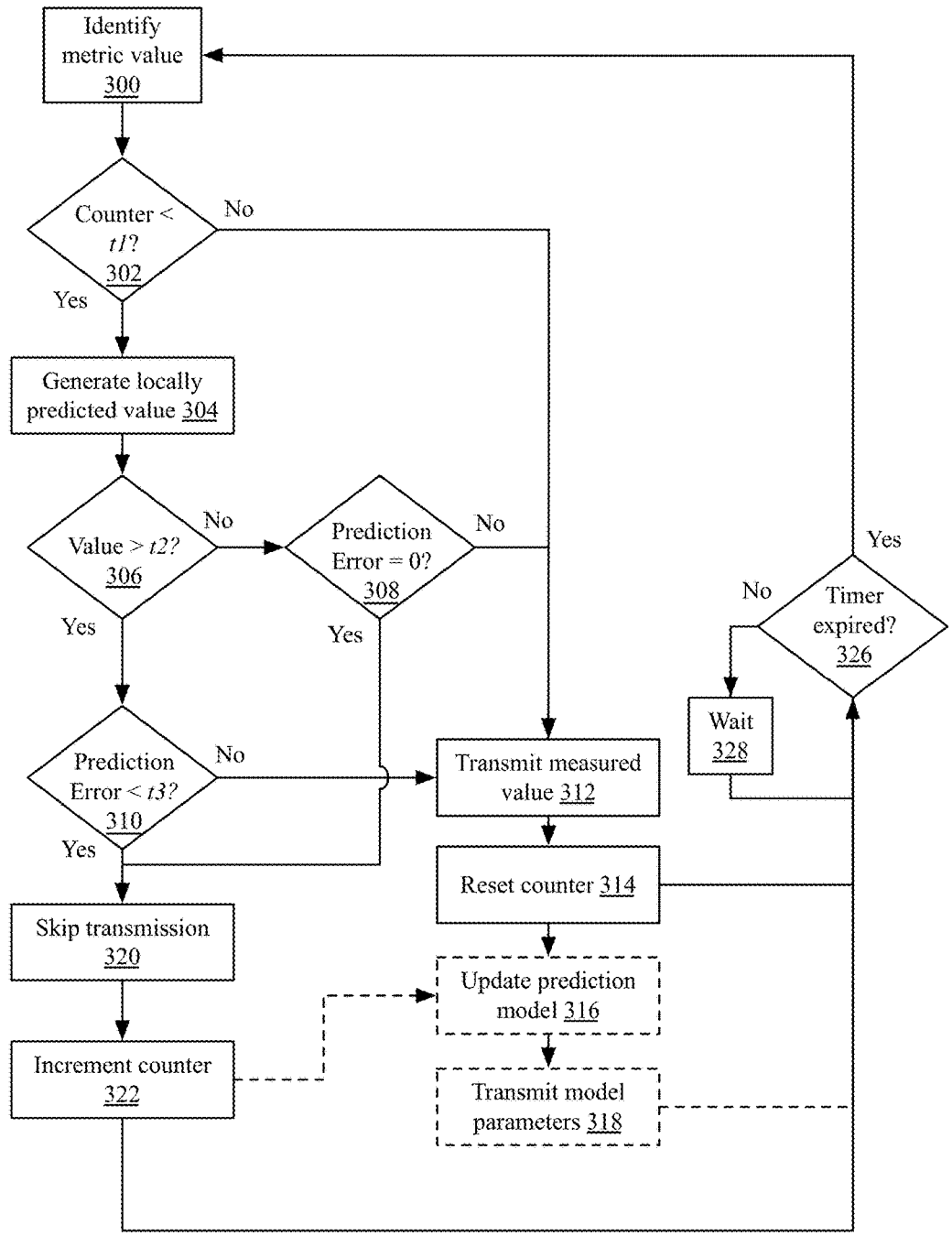
FIG. 3A is a flowchart of an embodiment of a method for prediction-based data exchange.

FIG. 3A is a flowchart of an embodiment of a method for prediction-based data exchange performed by a client device or measurement data source. At step 300, the client device may identify a value for a metric. Identifying the value may comprise reading a sensor output, retrieving a sensor value (e.g. by querying an operating system or network stack), and/or receiving the sensor value from another device. As discussed above, the value may be of any type and format. Identifying the value may comprise formatting the value, in some implementations (e.g. truncating or rounding the value, scaling the value, etc.).

At step 302, in some implementations, the client device may determine whether a counter value exceeds a minimum sync period threshold t1. As discussed above, the client device may be configured to transmit the actual measurement value regardless of any prediction error after a predetermined number of skipped transmissions. The threshold t1 may be preset, or may be dynamically set (e.g. by a monitoring server) based on a frequency of use of the metric (e.g. frequency of access to the metric in a log, frequency of access to the log, etc.). In some implementations, the server may provide threshold t1 to the client device, e.g. as part of a response to a RESTful request comprising metric values. Thus t1 may be dynamically modified during runtime.

If the counter value is equal to or exceeds threshold t1, then at step 312, the client device may transmit the measured metric value to the monitoring server. The transmission may be of any type and form, such as a parameter-value pair in a RESTful HTTP request. Transmitting the value may comprise performing an authentication or handshaking procedure, in some implementations. At step 314, the client device may reset the counter value, responsive to transmitting the actual measurement value.

In some implementations, steps 300-314 may be repeated periodically. Accordingly, in such implementations, at step 326, the client device may determine whether a timer has expired. The timer may be reset at step 314 on transmission of the metric data. If the timer has not expired, then the client device may wait for a predetermined period at step 328. Steps 326-328 may be repeated until the timer expires, indicating a next measurement time period.

If the counter value is less than threshold t1 (or not yet reached zero, in implementations in which the counter is instead decremented), then at step 304, the client device may generate a locally predicted value for the metric. As discussed above, the local prediction service of the client may generate the locally predicted value using any suitable algorithm, including a time-series regression algorithm, using coefficients trained in the prediction model from actual measurement data.

At step 306, in some implementations, the client device may determine if the measured metric value is beyond a second threshold t2 or critical value. For example, in some implementations as shown, t2 may comprise a lower threshold, and the client device may determine if the value is greater than t2. In other implementations, t2 may comprise an upper threshold and the client device may determine if the value is less than t2. If the value is beyond t2 (beyond a normal range, either above an upper threshold or below a lower threshold), then at step 308, in some implementations, the client device may determine if the prediction error is 0. Determining the prediction error may comprise determining a difference between the locally predicted value and the actual measured value. If the prediction error is non-zero, then the actual measured value may be transmitted to the server at step 312, as discussed above. In other implementations, step 308 may be skipped, such that all measured values are transmitted to the server when the measured values are beyond threshold t2. In such implementations, step 306 may be performed prior to step 304.

If the measured value is not beyond threshold t2, then at step 310, the client device may determine if the prediction error is less than an error threshold t3. As discussed above, if the error is too large, the prediction model may become out of sync with the measured data. Accordingly, if the prediction error is not less than error threshold t3, then the client device may transmit the actual measurement value at step 312.

If the prediction error is less than threshold t3, or if the value is beyond critical value threshold t2 but the prediction error is zero, then at step 320, the client device may skip transmitting the actual measurement data. In some implementations, the actual measurement data may still be written to a local log (e.g. for use in training the prediction model). The locally predicted value may be discarded, in some implementations. At step 322, the client device may increment the minimum sync period counter value. Steps 300-322 (and potentially 326-328) may be repeated iteratively at each unit time period. In some implementations, steps 300-328 may be performed in parallel for different metric values, or in series. For example, in some implementations, at step 300, the client device may identify a plurality of measurements (e.g. network bandwidth, congestion, loss rate, latency, etc.). The client device may similarly generate a plurality of locally predicted values at step 304, and perform a plurality of comparisons at steps 306-310. The client device may skip transmissions of some or all of the values based on the comparisons as discussed above. In some implementations, the client device may transmit all of the values if any comparison indicates that data should be transmitted at step 312. In other implementations, the client device may transmit only the values for which comparisons indicate the actual data should be transmitted. For example, if predictions for bandwidth, loss rate, and congestion are all accurate, but the latency prediction is inaccurate, in some implementations, only the measured latency value may be transmitted. In other implementations, all of the values may be transmitted. Although transmitting all of the values may consume additional data, the packet overhead, handshaking, or other data may be more significant than a few additional parameter-value pairs in a request, such that including all of the values adds only a small amount to the necessary resource consumption, while increasing accuracy.

In some implementations, the client device may periodically update the prediction model at step 316 using the actual measured data for the metric. The client device may perform regression analysis and/or adjust model coefficients to make the predicted value equal to a corresponding measured value. At step 318, the adjusted coefficients and/or model parameters may be transmitted to the monitoring server to use with the remote prediction service.

Figure 3B:
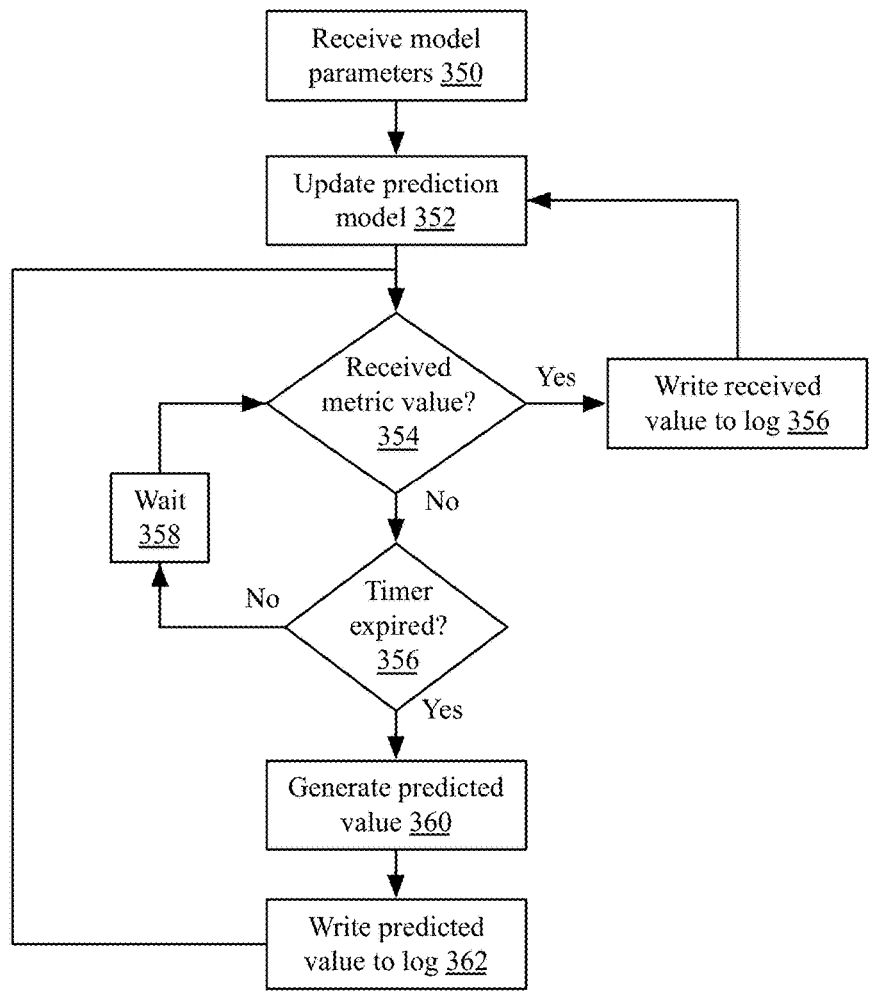
FIG. 3B is a flow chart of another embodiment of a method for prediction-based data exchange.

FIG. 3B is a flow chart of another embodiment of a method for prediction-based data exchange performed by a monitoring server. At step 350, the monitoring server may receive parameters and/or coefficients of a prediction model for a device. The parameters and coefficients may be received via any suitable means, including as parameter-value pairs of a RESTful HTTP request. At step 352, the monitoring server may update a model of a remote prediction service for the client device. As discussed above, "remote" is used here to refer to the prediction service of the monitoring server, and is remote from the client device.

In some implementations, at step 354, the monitoring server may receive a measured value for a metric from the client device. If so, the metric may have been sent because a minimum sync period has expired, because the value is beyond a critical threshold and a prediction error is non-zero, or because a prediction error was too large. Regardless, at step 356, the monitoring server may write the received value to a log or database for the metric for the client device. At step 352, in some implementations, the monitoring server may update the prediction model with the newly received measurement value (e.g. updating a regression algorithm calculation. In other implementations, step 352 may be skipped and the model may only be updated on receipt of model parameters.

If the measured metric value has not been received, then at step 356, the monitoring server may determine if a timer has expired. The timer may correspond to a unit time interval as discussed above. If the timer has not expired, then the monitoring server may wait at step 358 and repeat steps 354-356.

Upon expiration of the timer, at step 360, a prediction service of the monitoring server may generate a predicted value (which may be referred to as the "remote predicted value" as discussed above). The remote predicted value may correspond to a "locally" predicted value generated by the local prediction service of the client device, used by the client device to determine to skip transmission of the actual measured value. At step 362, the monitoring server may write the predicted value for the metric to the log or database for the client device. Steps 354-362 may be repeated for the next interval (and steps 350-356 repeated, if model parameters are re-received).

As discussed above, the method of FIG. 3B may be performed in serial or parallel for a plurality of metrics of a client device, as well as for a plurality of metrics from a plurality of client devices. The logs of the monitoring device will thus be complete and reasonably accurate, at a drastically reduced level of consumption of resources and network bandwidth. The system is accordingly highly scalable and efficient.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for prediction-based data exchange, comprising:
   identifying, by a monitor of a device, a first measured value for a metric;
   transmitting, by the device, the first measured value for the metric to a remote management device;
   generating, by a local prediction service of the device, a first locally predicted value for the metric;
   identifying, by the monitor, a second measured value for the metric;
   determining, by the device, that a difference between the first locally predicted value and the second measured value does not exceed a first threshold; and
   responsive to the determination, skipping transmission of the second measured value, by the device to the remote management device, the remote management device executing a remote prediction service generating a first remotely predicted value for the metric of the device corresponding to the first locally predicted value.

2. The method of claim 1, wherein transmitting the first measured value for the metric to the remote management device further comprises:
   generating, by the local prediction service, a second locally predicted value for the metric;
   determining, by the device, that a difference between the second locally predicted value and the first measured value exceeds the first threshold; and
   responsive to the determination that the difference between the second locally predicted value and the first measured value exceeds the first threshold, transmitting the first measured value to the remote management device.

3. The method of claim 1, further comprising incrementing a counter of the device, responsive to skipping transmission of the second measured value.

4. The method of claim 3, further comprising:
   determining, by the device, that a difference between a subsequent locally predicted value generated by the local prediction service for the metric and a corresponding measured value identified by the monitor for the metric does not exceed the first threshold;
   identifying that a value of the counter exceeds a second threshold, responsive to the determination that the difference between the subsequent locally predicted value and the corresponding measured value does not exceed the predetermined threshold; and
   transmitting the corresponding measured value identified by the monitor to the remote management device, responsive to the identification that the value of the counter exceeds the second threshold.

5. The method of claim 4, further comprising resetting the counter, responsive to transmitting the corresponding measured value received by the monitor to the remote management device.

6. The method of claim 4, further comprising setting the second threshold to a value inversely proportional to a frequency of utilization of the metric.

7. The method of claim 1, wherein generating the first locally predicted value for the metric further comprises generating the first locally predicted value, by the local prediction service, using a subset of measured values for the metric identified by the monitor and transmitted to the remote management device.

8. The method of claim 7, further comprising updating coefficients of a prediction model, by the local prediction service, using the subset of measured values.

9. The method of claim 8, further comprising transmitting the updated coefficients of the prediction model to the remote management device.

10. The method of claim 1, further comprising:
generating, by the local prediction service, a second locally predicted value for the metric;
identifying, by the monitor, a third measured value for the metric;
identifying, by the monitor, that the third measured value is below a second threshold;
determining, by the device, that a difference between the second locally predicted value and the third measured value is non-zero, responsive to the identification that the third measured value is below the second threshold; and
responsive to the determination that the difference between the second locally predicted value and the third measured value is non-zero and the identification that the third measured value is below the second threshold, transmitting the third measured value to the remote management device.

11. A method for prediction-based data exchange, comprising:
generating, by a prediction service of a device, a first locally predicted value for a metric of a remote device;
determining, by the device, that a first measured value for the metric has not been received from the remote device within a predetermined period of time, the remote device skipping transmission of the first measured value to the device responsive to a difference between the first measured value and a first remotely predicted value for the metric generated by a remote prediction service of the remote device not exceeding a first threshold; and
responsive to the determination, adding the first locally predicted value for the metric to a log for the remote device.

12. The method of claim 11, further comprising:
generating, by the prediction service of the device, a second locally predicted value for the metric of the remote device;
receiving, by the device from the remote device, a second measured value for the metric;
adding the received second measured value for the metric to the log for the remote device; and
discarding the second locally predicted value for the metric of the remote device, responsive to receipt of the second measured value.

13. The method of claim 12, further comprising updating a model of the prediction service of the device with the received second measured value for the metric of the remote device.

14. A system for prediction-based data exchange, comprising:
a device comprising a monitor, a management client, and a local prediction service;
wherein the monitor identifies a first measured value for a metric;
wherein the management client transmits the first measured value for the metric to a remote management device;
wherein the local prediction service generates a first locally predicted value for the metric; and
wherein the management client determines that a difference between the first locally predicted value and a second measured value for the metric identified by the monitor does not exceed a first threshold and responsive to the determination skips transmission of the second measured value to the remote management device, the remote management device executing a remote prediction service generating a first remotely predicted value for the metric of the device corresponding to the first locally predicted value.

15. The system of claim 14,
wherein the local prediction service generates a second remotely predicted value for the metric;
wherein the management client determines that a difference between the second remotely predicted value and the first measured value exceeds the first threshold and responsive to the determination, transmits the first measured value for the metric to the remote management device.

16. The system of claim 14, further comprising a counter, and wherein the management client increments a value of the counter, responsive to skipping transmission of the second measured value.

17. The system of claim 16, wherein the management client:
determines that a difference between a subsequent locally predicted value generated by the local prediction service for the metric and a corresponding measured value identified by the monitor for the metric does not exceed the first threshold;
identifies that a value of the counter exceeds a second threshold, responsive to the determination that the difference between the subsequent locally predicted value and the corresponding measured value does not exceed the predetermined threshold; and
transmits the corresponding measured value identified by the monitor to the remote management device, responsive to the identification that the value of the counter exceeds the second threshold.

18. The system of claim 17, wherein the management client sets the second threshold to a value inversely proportional to a frequency of utilization of the metric.

19. The system of claim 14, wherein the local prediction service generates the first locally predicted value using a subset of measured values for the metric identified by the monitor and transmitted to the remote management device.

20. The system of claim 14,
wherein the local prediction service generates a second locally predicted value for the metric;
wherein the monitor identifies a third measured value for the metric, and identify that the third measured value is below a second threshold; and
wherein the management client:
determines that a difference between the second locally predicted value and the third measured value is non-zero, responsive to the identification that the third measured value is below the second threshold, and
transmits the third measured value to the remote management device, responsive to the determination that the difference between the second locally predicted value and the third measured value is non-zero and the identification that the third measured value is below the second threshold.

* * * * *